Jan. 30, 1940.   A. B. POSCHEL   2,188,866
RUBBER TRANSFER OR DECALCOMANIA
Filed June 1, 1936
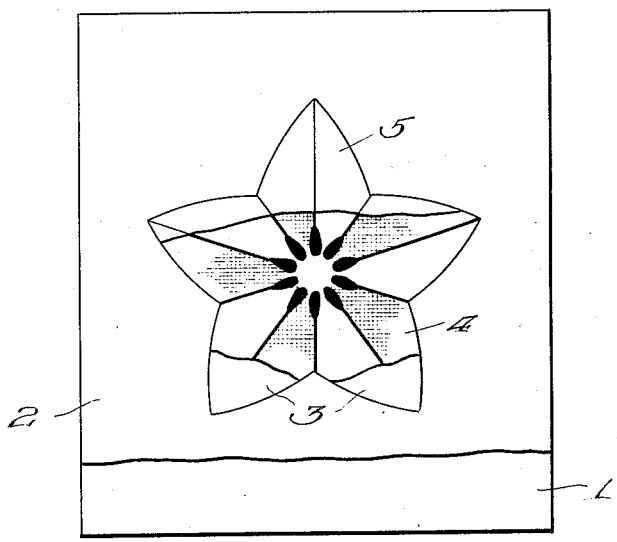
Inventor:
Alfred B. Poschel,
by Wm. F. Freudenreich,
Atty.

Patented Jan. 30, 1940

2,188,866

UNITED STATES PATENT OFFICE 2,188,866

RUBBER TRANSFER OR DECALCOMANIA

Alfred B. Pöschel, Chicago, Ill., assignor to Meyercord Company, a corporation of Illinois Application June 1, 1936, Serial No. 82,824

1 Claim. (Cl. 41—33)

The object of the present invention is to provide an improved method for the decoration or marking of rubber products.

Heretofore, rubber products have been decorated by direct printing, stencilling or stamping. Also ordinary decalcomanias have been used for the same purpose. However, these methods have given inferior results because ordinary printing inks are not elastic and consequently deteriorate with stretching or bending of the rubber and also easily rub and wash off.

Improvements over these methods have been made by employing rubber as the ink vehicle to insure better adhesion and elasticity of the applied decoration; and, also, by printing thin rubber sheets and vulcanizing them along with the rubber products for which they are intended. However, technical limitations in handling elastic rubber products or rubber sheeting for printing purposes have caused such decorations or markings to be confined to very simple designs in one or two colors, while halftones and superimposed multicolor effects have not been possible of achievement.

My present invention enables me to produce at a comparatively low cost in any color combination and tone graduation, a rubber transfer or rubber decalcomania which remains permanently stretchable when applied to rubber products. Thereby more durable and more artistic decorations than could heretofore be obtained are made available.

My new rubber transfers can be applied to and be vulcanized with the rubber products for which they are intended, during the manufacture of these products; they can be cemented to finished rubber products without the necessity of an additional vulcanization; and they may also be affixed by heat and pressure to certain products of rubber or other stretchable materials.

A rubber transfer in accordance with, or as produced by, the present invention comprises a rubber transfer film mounted on a suitable carrier composed of a material that does not stretch as does rubber. The carrier may conveniently be of paper having thereon a soluble gum coating overlaid with a layer of rubber which includes coloring material and design-forming subdivisions. Or, the rubber may be in a plurality of layers, at least one of which includes coloring material and design-forming subdivisions.

The commercial production of such a rubber transfer for the decoration or marking of rubber products with permanently stretchable, indelible and ineffaceable decorations or markings is the main object of the present invention which, in certain of its aspects, may be said to include the steps of preparing special rubber Rotogravure printing inks and rubber coating material, and respectively printing and coating said rubber printing inks and rubber coating material in the required sequence at a comparatively high speed in a Rotogravure printing press and/or a coating machine upon a suitable transfer paper.

A further object of this invention is to produce a rubber transfer in which the superimposed rubber layers are confined to the actual outlines of the decorative design or marking.

A further object of this invention is to produce a transferable design in rubber inks and other rubber material which shall be so thin that it may be affixed to a rubber product without perceptibly raising the surface area where the design is located.

A further object of this invention is to produce a rubber transfer which shall not deteriorate upon the application of cellulose lacquers to the finished decorated rubber product.

A further object of this invention is to produce a rubber transfer which is adaptable to a wide range of molding and vulcanization conditions such as are encountered in the manufacture of rubber products.

A further object of the present invention is to produce a rubber transfer which is so formed as to permit the separation of the carrier sheet from the rubber layer either by wetting the carrier sheet or by dry stripping.

The various features of novelty whereby my invention is characterized will hereinafter be pointed out with particularity in the appended claim; but, for a full understanding of my invention and of its objects and advantages, reference may be had to the following detailed description:

In carrying out my invention I prefer to use the commercially available decalcomania papers, either simplex or duplex type, as the carrier for my rubber transfer, although other transfer carrier sheets could be devised for use in this connection.

Depending upon the uses to which the rubber transfers are to be put, the rubber layer or layers forming the transfer may consist either of the design forming rubber ink only, or if a transfer of greater tensile strength is required, they may include layers of clear or pigmented rubber coating material. The design-forming layer may then be carried under, on top of or between such rubber coating layers.

In each case the rubber layers may be confined to the limits of the design, whereby the necessity of die cutting the transfer before its use is eliminated. Or, some of the rubber layers may be extended over the entire surface of the transfer carrier, and may also be built up to sufficient strength to permit dry stripping of the combined rubber layers from the carrier.

In some cases it may be desirable to incorporate in at least one of the rubber layers thermo adhesive material to permit the rubber transfers to be affixed to rubber products by heat and pressure. A thermo adhesive resin that is sold under the name of "Cumar" is suitable for this purpose.

In cases where a relatively great flow of the rubber material in the molding of the rubber product has to be taken into consideration, the rubber layers of the transfer should be built up to a thickness of several thousandths of an inch, and the rubber material should contain sufficient of the usual or any suitable vulcanization agents, to permit a semi-curing of the rubber layers to take place before the transfer goes into the mould with a product to be molded and subsequently cured.

My rubber transfers will withstand a wide variation of curing conditions. For instance, one rubber product has been molded and cured for ten minutes at 40 pounds steam pressure and 2000 pounds hydraulic pressure, while another rubber product has been molded and cured for 7 minutes at 60 pounds steam pressure and 1500 pounds hydraulic pressure, without appreciable difference in quality of the applied transfer. However, for extreme curing conditions, the transfer can be specially compounded.

My rubber transfers are printed with intaglio printing plates, usually by Rotogravure printing. The printing operations, etc., are the same and follow the same routine as in ordinary multicolor printing. All shades of colors can be produced in line or halftones or solids, and can be superimposed and held in good register.

In Rotogravure printing or intaglio printing, liquid inks of rather low viscosity which dry by evaporation have to be used.

In preparing inks for my rubber transfers, either dissolved rubber or rubber latex may be employed as the base or film forming material of the ink.

A rubber Rotogravure ink of the solvent type may be produced by dissolving milled crepe rubber; mixing with the solution coloring material previously made into paste form; milling the mixture; then adding, if required, suitable vulcanization agents previously dispersed; and, finally, adjusting the viscosity and the drying speed of the ink accordingly to the printing conditions with high or low boiling solvents which are active or compatible with rubber. An example of a working formula is the following:

A 1500 grams milled crepe rubber dissolved in 15000 cc. xylol, 2500 cc. anhydrous ethyl alcohol;
2500 cc. pentacetate.
B 2500 grams color pigment
2500 cc. xylol are milled to a fine paste.
C 8000 cc. rubber solution A are mixed and milled with 4000 cc. color paste B; 500 cc. benzole and 500 cc. high boiling naphtha added in which previously suitable vulcanizing agents have been dispersed; for instance, 5 grams "zimate," 10 grams "captax," 10 grams zinc oxide, 10 grams colloidal sulphur and 10 grams Age Rite. A suitable ink thinner xylol may be used.

The following is an example of a working formula for rubber latex ink:

D 2000 grams color pigment, 2000 cc. water and 50 cc. Turkish red oil are ground to paste.
E 500 cc. turpentine
400 cc. water, 30 grams stearic acid and 70 cc. triethanolamine are emulsified.
F The color paste D is mixed in the turpentine emulsion E and 8000 cc. rubber latex (60%) added and milled together and 100 cc. glycerine added. Vulcanizing agents may also be incorporated after having been dispersed in water.

When using latex inks the contamination of the latex with traces of copper which may result from contact of the latex with the copper printing plate should be prevented, since otherwise an inferior rubber film or layer may be the result.

Various methods may be used for applying my rubber transfers to different rubber products.

For rubber products which are molded and cured in the molds the transfer may be squeezed to the uncured piece of rubber mix which is to form the final product. Ordinarily, uncured rubber is tacky enough to hold the transfer in place without having to resort to other holding means. The paper backing is then removed with water or by stripping, and thereafter the molding and curing is done as usual. The stripped transfer can also be placed in the mold first and the rubber mix laid over it with the same result. After the curing, the transfer is entirely integrated with the cured rubber and stretches in the same proportion without deterioration.

To rubber products which have already been vulcanized, the transfer may be affixed with rubber cement. In this case a small amount of rubber cement, preferably self-vulcanizing, is spread upon the surface of the rubber product, and the transfer is pressed on after the cement has partly set, and the paper backing is then removed and all traces of gum washed off. After the cement is entirely set, the rubber product can be lacquered or otherwise finished without damage to the transferred decoration.

The rubber transfer can also be affixed to suitable rubber products or to other stretchable material like textiles, etc., by means of heat and pressure as, for instance, by simply using a hot iron.

My rubber transfers retain their transfer quality and property for a considerable time, which permits their manufacture without regard to the time and location of their final use.

Rubber transfers, manufactured as above described, make excellent and very durable decorations or markings of any kind which will not rub off, wash off, bleed or crackle, and will remain flexible as long as the rubber product itself. In all cases the applied decoration or marking is firmly bonded to the rubber product, although when simply cemented to a rubber surface it is not as well integrated as when it is applied and vulcanized along with the rubber product at the time the latter is being produced.

Production costs being the vital factor in determining the present costs of rubber transfers, it is evident that the manufacture of such transfers by high speed printing as I have set forth in this specification will permit much lower costs for the mass production of rubber transfers.

When a relatively small quantity of rubber transfers have to be produced, silk screen printing may be substituted for intaglio plate or Rotogravure printing. However, in such cases, the viscosity of the rubber inks must be greatly increased and the fine tone graduations of Rotogravure printing are impossible of attainment.

In the accompanying drawing there is illustrated more or less diagrammatically one of my new decalcomanias in one of its more elaborate forms; each layer that overlies the paper carrier being broken away sufficiently to expose the underlying layer or layers. In the drawing, 1 represents the paper carrier or backing and 2 a water soluble gum coating. Printed or otherwise imposed upon this gum coating are three thin rubber layers; the first layer 3 being a rubber coating having exactly the size and shape of the design which, in the present instance, is a star shaped flower. Overlying and registering with the layer or coat 3 is the pigmented rubber layer 4 which is assumed to have been applied by printing with an intaglio plate or plates, where large quantities of this particular transfer are to be produced, and by stencil printing, in the case of small quantities. The layer 4 constitutes the subject or design. Overlying the layer 4 is a rubber coating or layer 5 which is of exactly the same size and shape as the coating or layers 3 and 4, and which registers with the latter. Either or both of the coats 3 and 5 may be practically transparent. The three layers or coatings form an integral whole and provide a tough rubber film which may be removed by stripping, as well as by dissolving the gum coating on paper.

While I have described with particularity only the preferred form of my invention, I do not desire to be limited to all of the specific details of the transfer, the inks and the method thus described; but intend to cover my invention in the various aspects thereof set forth in the definitions thereof constituting the appended claim.

I claim:

A transfer comprising a carrier, a layer of water soluble material upon said carrier, and a thin elastic film of rubber overlying said layer of water soluble material, said film comprising a plurality of layers one of which contains a thermo-adhesive material.

ALFRED B. PÖSCHEL.